United States Patent Office.

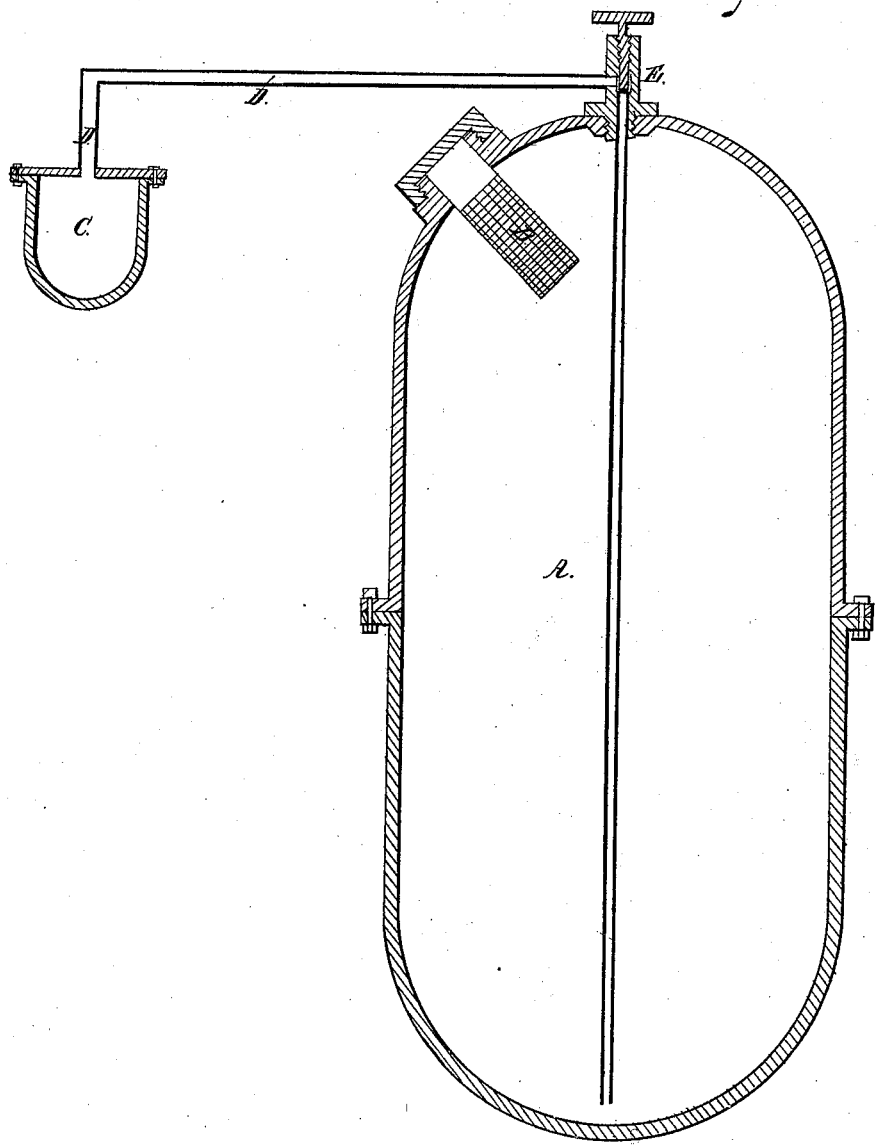

JAMES S. BALDWIN, OF NEW YORK, N. Y.

IMPROVED METHOD OF CHARGING WATER WITH CARBONIC ACID.

Specification forming part of Letters Patent No. 55,040, dated May 29, 1866.

*To all whom it may concern:*

Be it known that I, JAMES S. BALDWIN, of the city, county, and the State of New York, have invented or discovered a method of preparing and charging vessels with carbonic acid in water or any other liquid in which the said carbonic acid will dissolve; and I inclose in a close vessel, A, the water or other liquid to be charged and a sufficient quantity of previously-prepared solid carbonic acid in charger B, which by its volatilization produces the necessary pressure to produce or give the solution of the gas so formed. In some cases I prefer to inclose the solid carbonic acid in a separate vessel, C, and allow the gas formed by its volatilization to pass through a tube, D, or other passage into the water or liquid to be charged; and I hereby declare that the the following is a full and sufficient description thereof, reference being had to the accompanying drawings and references marked thereon.

In the drawing hereof, let A represent the vessel containing the liquid to be charged, and let B represent the receptacle of the solid carbonic acid, so perforated as to allow the gas resulting from the volatilization aforesaid to pass into the water or other liquid and be dissolved therein. The use of this receptacle B is not indispensable, but is convenient, and the acid could be introduced therein without any cover or protection.

C represents a separate vessel, which may be substituted for the vessel B, containing the carbonic acid, and connected to the aforesaid vessel A by means of the tube D D, through which the solid carbonic acid charged into the said vessel C passes, in consequence of its volatilization in vessel C, and becomes absorbed into the liquid contained in the aforesaid vessel A. The said volatilized carbonic acid also passes through the screw-cock E before it enters the liquid to be charged. The aforesaid screw-cock E is also used for the purpose of closing up the said vessel A, when it is to be preserved for future use or for transportation from place to place. These two charging-vessels B or C may each be used for the same purpose—viz., for charging the reservoir A—and they are regarded each as the equivalent of the other.

In the apparatus above described the use of pumps and other machinery for forcing carbonic acid into the reservoir A is entirely dispensed with.

In the preparation of the fountain or vessel A for receiving the carbonic acid in the gaseous state, the usual quantity of water is first poured into the fountain, as is done in the charging of soda-fountains by the ordinary means.

My invention does not relate to the discovery of solidifying carbonic acid, but to the application of the solidified acid to a practical purpose in the domestic arts. Although this solidification was discovered some forty years ago, no practical use of the scientific fact has been made up to the present day.

I propose, therefore, to introduce this compound to subserve a great and valuable purpose by showing that it may be used for charging reservoirs so cheaply that it may be sold and delivered to our houses as readily as ice is now distributed to the domestic household. It is only necessary to show that the acid may be obtained by utilizing the waste products of manufactures of the cheapest kind and at a small cost—even less than that of any other known preparation. It is believed that the introduction and use of cheapened processes for obtaining soda-water and rendering this drink universal would do very much to diminish the use of wines and intoxicating liquors. If I have been the first to utilize this product—solid carbonic acid—and adapt it to domestic and mercantile use I am entitled to a patent.

What I claim as my invention, and desire to secure by Letters Patent, is—

Charging water or other equivalent liquid with carbonic acid by inclosing said liquid, with solid carbonic acid, in the same vessel or series of vessels, substantially in the manner and for the purpose herein set forth.

JAMES S. BALDWIN.

Witnesses:
WM. H. RIBLET,
L. D. GALE.